(12) United States Patent
Odachowski (10) Patent No.: US 6,598,310 B1
(45) Date of Patent: Jul. 29, 2003

(54) RETRACTABLE TAPE MEASURE

(76) Inventor: Mark Odachowski, 9939 Jerry Mack Rd. - Suite 400, Ocean City, MD (US) 21842

( * ) Notice: Subject to any disclaimer, the term of this patent is extended or adjusted under 35 U.S.C. 154(b) by 0 days.

(21) Appl. No.: 09/704,324

(22) Filed: Nov. 2, 2000

Related U.S. Application Data (63) Continuation-in-part of application No. 09/494,935, filed on Feb. 2, 2000.

(51) Int. Cl.[7] ................................................. G01B 3/10
(52) U.S. Cl. .............................. 33/755; 33/757; 33/759
(58) Field of Search ........................... 33/755, 757, 759, 33/760, 761, 764, 767, 769, 770, 494

(56) References Cited

U.S. PATENT DOCUMENTS

| | | | |
|---|---|---|---|
| 1,081,673 A | 12/1913 | Kueffel | 33/755 |
| 1,986,551 A | 1/1935 | Anderson | 33/769 |
| 3,164,907 A | 1/1965 | Quenot | 33/767 |
| 3,270,421 A | 9/1966 | Jones | 33/759 |
| 3,289,305 A | 12/1966 | Norton | 33/494 |
| 3,686,767 A | 8/1972 | Duda et al. | 33/769 |
| 3,774,309 A | 11/1973 | Leopoldi | 33/769 |
| 3,908,277 A | 9/1975 | Rutty | 33/769 |
| 4,153,996 A | 5/1979 | Rutty | 33/767 |
| 4,194,703 A | 3/1980 | Roe | 242/767 |
| 4,352,244 A | 10/1982 | Tomuro | 33/757 |
| 4,439,927 A | 4/1984 | Elliott | 33/760 |
| 4,462,160 A | 7/1984 | Cohen et al. | 33/760 |
| 4,603,481 A * | 8/1986 | Cohen et al. | 33/768 |
| 4,696,110 A | 9/1987 | Walker et al. | 33/494 |
| 4,748,746 A | 6/1988 | Jacoff | 33/761 |
| 4,938,430 A | 7/1990 | Chapin | 33/767 |
| 5,210,956 A | 5/1993 | Knispel et al. | 33/761 |
| 5,245,761 A * | 9/1993 | Waldherr | 33/767 |
| 5,657,551 A * | 8/1997 | Lin | 33/767 |
| 5,718,056 A | 2/1998 | Miyasaka et al. | 33/761 |
| 5,894,677 A * | 4/1999 | Hoffman | 33/759 |
| 5,913,586 A | 6/1999 | Marshall | 33/759 |
| 5,983,514 A | 11/1999 | Lindsey | 33/755 |

* cited by examiner

Primary Examiner—Christopher W. Fulton
(74) Attorney, Agent, or Firm—Larry J. Guffey (57) ABSTRACT

The present invention discloses an improved retractable tape measure of the type including a housing (12) having an opening (14), a retractable measuring tape (16) with top (18) and bottom (20) surfaces, edges (22, 24) that turn upward so as to stiffen the tape (16) from being bent downward by the force of gravity, a free end (26) that extends through the opening (14), an end stop (28) that is mounted on the tape's free end (26), and top measurement indicia (30) that are inscribed on the top surface (18) of the measuring tape (16). Wherein, the improvement comprises bottom measurement indicia (32) on the bottom surface (20) of the measuring tape (16), and the location of the housing opening (14) in the front portion (33) and proximate the top portion (34) of the housing (12) so that, when the tape measure (10) is being used to measure against an overhead surface with the edges (22, 24) being held adjacent the overhead surface, the portion of the tape (16), that extends through the opening (14) and is in closest proximity to the housing (12), can be held in close proximity to the overhead surface without having to bend the tape (16) to move the housing (12) away from the overhead surface.

39 Claims, 9 Drawing Sheets

RETRACTABLE TAPE MEASURE

This application is a continuation-in-part of applicant's co-pending application U.S. Ser. No. 09/494,935, filed Feb. 2, 2000, and titled "Tape Measure."

BACKGROUND OF THE INVENTION

1. Field of the Invention

The present invention generally relates to geometrical instruments for measuring distance. More particularly, this invention relates to an improved retractable, tape measure.

2. Description of the Related Art

Retractable tape measures have been popular for many years and have often been the subject of patent grants. For example, see U.S. Pat. Nos. 3,908,277, 4,153,996, 4,194,703, 4,439,927, 4,748,746, 4,938,430, 5,210,956 and 5,983,514.

In general, a retractable tape measure includes some widely recognized features, including: a metal tape that is retractably mounted within a housing, a retraction means for retracting the tape through a housing opening, an end stop for preventing the free end of the tape from retracting into the housing, and a lock which releasably secures the tape in an extended position. In order to provide stiffness to such a tape so that it's free end can extended to a maximum distance from its housing without bending, the tape is usually manufactured with lateral cross-section curvature created by having the tape's ends turned upward. This curvature also serves to differentiate the top side of the tape.

All of the above referenced tapes also share some other, not so widely recognized, features which serve to significantly limit their usefulness. These features include all these tapes having: (1) retractable tapes that extend from their housings at a point on the side of the front side of the housings which is proximate the housing's bottom surfaces, and (2) measurement indicia on only the top surface of the tape.

The reason for these features is apparently that such tapes are primarily intended for use in making measurements on surfaces or in planes that are lower than the eye level of the user, and where there are no obstructions above the plane of a desired measurement which would necessitate a user having to bend the tape downward so as to reposition the top portion of a tape's housing out of the way of such an obstruction. The logic of this last statement becomes apparent when it is recognized that the turned upward edges of the tape destroys its vertical symmetry, and means that such a tape cannot just be turned over, so as to make the tape's top surface indicia visible or to reposition the top portion of the housing out of the way of an obstruction, without losing the stiffening and avoidance-to-bending characteristics provided by the tape's turned upward edges.

Thus, despite their popularity, such standard tape measures are not always easy to use. For example, electricians and others often encounter significant problems in using a standard tape measure when they are making measurements from a wall to a distant spot that is more than an arms length away on an adjoining ceiling. See FIGS. 1–2. The first obstacle encountered is the lack of any markings on the tape's bottom side. Meanwhile, the numbers on the tape's top side cannot be seen by its user while he/she is holding the tape up against the ceiling. Unfortunately, as noted above, the tape cannot be turned over or the top portion of the tape's housing moved away from the ceiling without losing the stiffening effect of the tape's turned-up edges.

U.S. Pat. No. 1,986,551 discloses a steel, retractable tape which has indicia on the tape's bottom surface and at least some degree of lateral cross-section curvature. However, the tape's degree and extent of lateral cross-section curvature is unclear, as is its effectiveness for preventing tape bending. This situation arises because this patent's use of some imprecise wording and vague drawings at key points in its disclosure. For example, the tape is said to be "curved in cross-section and, when unrestricted, will assume a straight or rod-like form, as shown in FIGS. 1 and 2," (see col. 2, lines 12–14). However, the effect of the tape's lateral cross-section curvature in promoting this "straight or rod-like form" is non-existent in FIGS. 1 and 2 since these figures reveal a steel tape with its edges turned downward, which actually promotes bending. While the tapes in FIGS. 1 and 2 show no bending, this is not surprising since any such steel tape as shown in these figures (i.e., 0.5 inch width, a non-negligible thickness, and with its free end only four inches from its housing), would not, regardless of the lateral cross-sectional shape of the tape, be expected to show a degree of bending that is discernible to the naked eye. Meanwhile, the reason given in this patent for the downward turned edges is "to obtain direct close readings on the object measured" (see col. 1, lines 34–35), which suggests that this patent's tape measure is intended for use in measuring the tops of objects on which the tape has been extended, and therefore would not, in this situation, need support to prevent it from being bent downward under the force of gravity.

Thus, despite this prior art, one finds that standard, tape measures are not very user friendly. The need exists for an improved, retractable tape measure that is easier to use. An object of the present invention is to provide an improved, retractable tape measure that will overcome user problems such as the one described above.

Another object of the present invention is to provide an improved, retractable tape measure that can be used, for measuring extended distances, just as easily when those distances are on a ceiling or a floor.

Other objects and advantages of the present invention will become readily apparent as the invention is better understood by reference to the accompanying drawings and the detailed description that follows.

SUMMARY OF THE INVENTION

The present invention is generally directed to satisfying the need set forth above and the problems identified with prior retractable, tape measures.

This present invention is an improved, retractable tape measure. It is an improvement of the standard retractable tape measure which has a housing with an opening through which is extended and retracted a measuring tape which has a top and bottom surface, turned-up edges, a free end and top measurement indicia inscribed on the top surface of the tape. Such a tape is seen to be improved by the inclusion of bottom measurement indicia on the bottom surface of the tape, and locating the housing opening in the front portion and proximate the top portion of the housing so that, when the tape measure is being used to measure against an overhead surface, the portion of the tape that is extending through the opening and in closest proximity to the housing can be held in close proximity to the overhead surface without having to bend the tape to move the housing away from the overhead surface.

These improvements are significant in that they greatly enhance the usefulness of such a tape measure, especially for measuring overhead distances.

Other embodiments of the present invention will become readily apparent as the invention is better understood by reference to the accompanying drawings and the detailed description that follows.

DESCRIPTION OF THE PREFERRED EMBODIMENT

Figure 3:
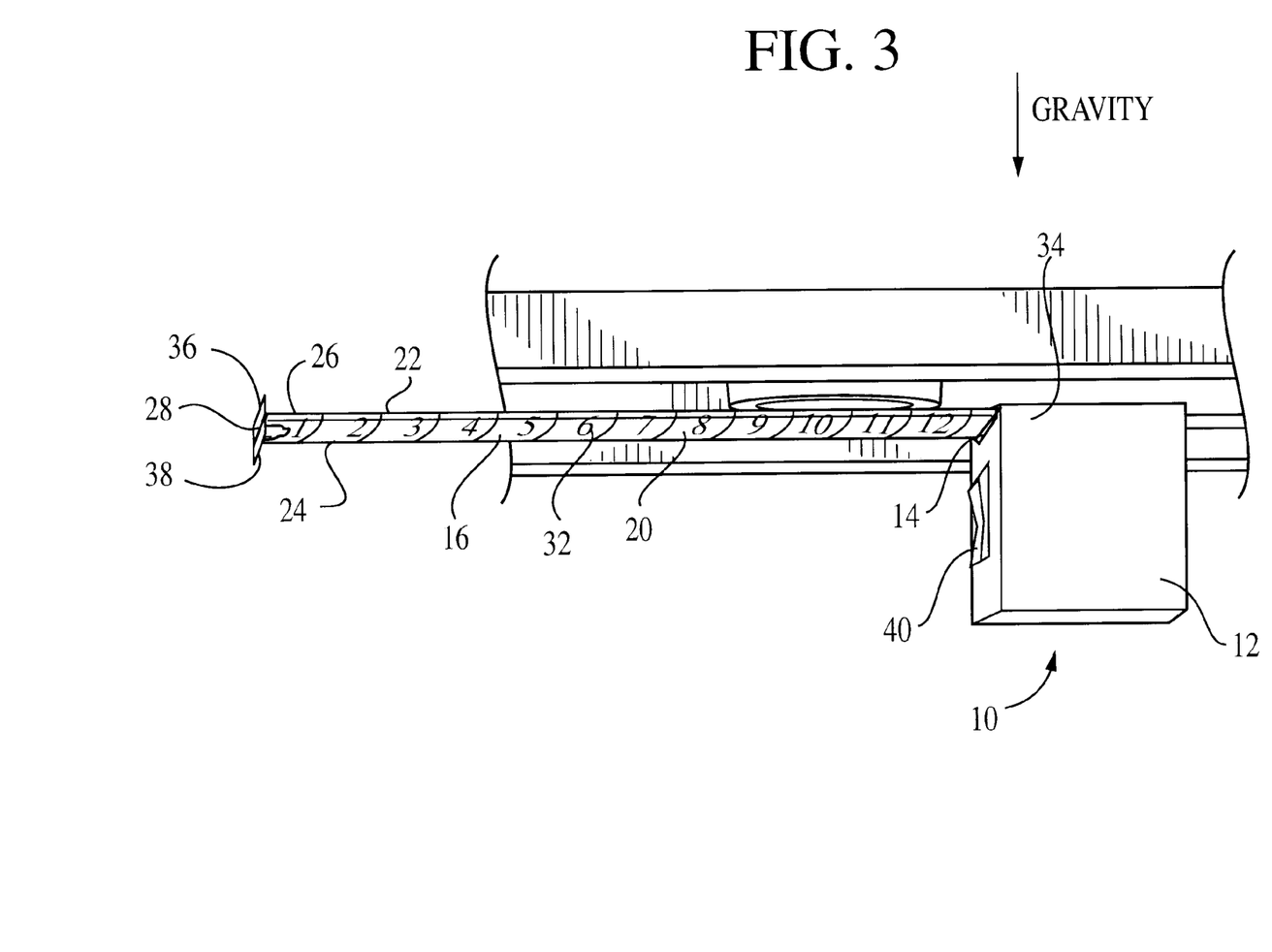
FIG. 3 is a perspective view of an embodiment of the present invention when viewed from below.

Referring now to the drawings wherein are shown preferred embodiments and wherein like reference numerals designate like elements throughout, there is shown in FIG. 3 a perspective view of an embodiment of the present invention in the form of an improved retractable, tape measure (10).

This embodiment includes a housing (12) having a tape opening (14), a retractable measuring tape (16) with top (18) and bottom (20) surfaces, edges (22, 24) that turn upward so as to stiffen the tape (16) from being bent downward by the force of gravity, and a free end (26) that extends through the opening (14). This embodiment further includes a lock mechanism (40), a bumper mechanism (80), an end stop (28) that is mounted on the tape's free end (26), and top measurement indicia (30) that are inscribed on the top surface (18) of the measuring tape (16).

Figure 4:
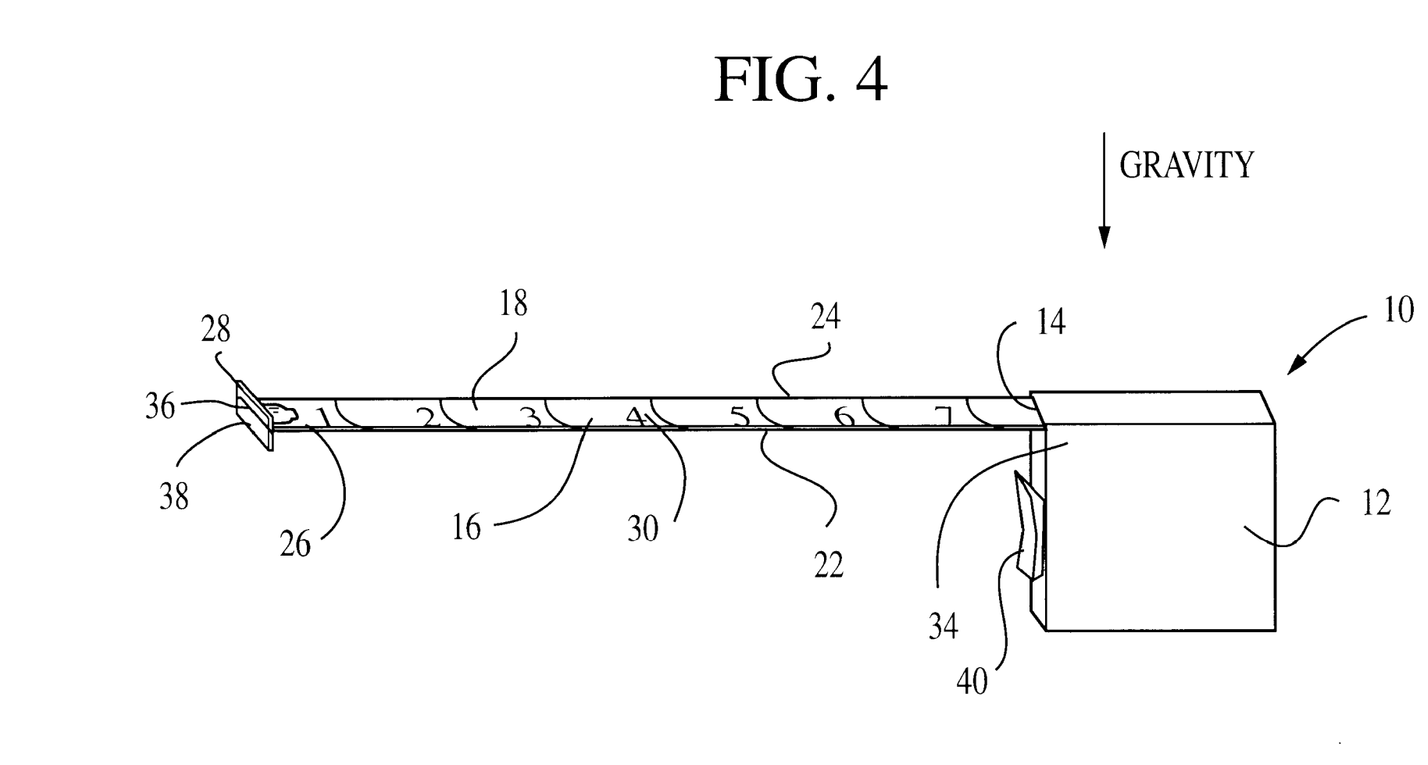
FIG. 4 is a perspective view of an embodiment of the present invention when viewed from above.

Similar to prior retractable tape measures, FIGS. 3 and 4 reveal that the tape opening is in the front portion of the tape's housing. However, contrary to prior retractable tape measures, this opening is seen to be proximate the housing's top portion and not its bottom edge. Additionally, this embodiment is seen to be have been improved by the inclusion of bottom measurement indicia (32) on the bottom surface (20) of the measuring tape (16).

The advantage of this configuration is that in using the tape measure (10) to measure against an overhead surface with its edges (22, 24) being held adjacent the surface, the portion of the tape (16), that extends through the opening (14) and is in closest proximity to the housing (12), can be held in close proximity to the overhead surface without having to bend the tape (16) to move the housing (12) away from the overhead surface.

The tape's housing (12) is formed of two half casing elements (12a, 12b) that are secured together by screws in a known manner. The two halves of the casing define a front portion (33) and a top portion (34).

In order to lock the tape (16) in an extended position, a tape lock mechanism (40) is preferably located in either the housing's front or top portions. With a front portion location, the lock mechanism, shown in FIG. 5, includes an actuator (44) and a slide plate (52). The actuator is pivotly mounted on a post (46) between the casing halves (12a, 12b). The actuator has an exposed surface (48) which protrudes through an actuator opening (42) in the housing's front portion. Pressure on this surface (48) by a tape user moves the actuator (44) between a first position (the unlocked position) and a second position (the locked position).

Figure 5:
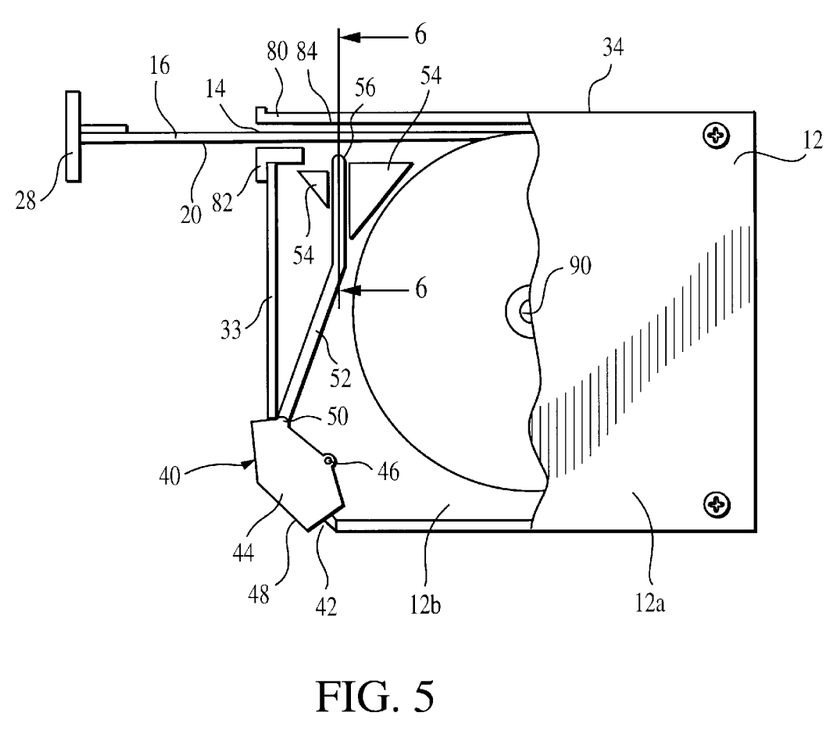
FIG. 5 is a side view of an embodiment of the present invention showing its front-portion-located lock mechanism and cooperating top bumper mechanism.

The actuator (44) includes a hook member (50) that engages the slide plate (52) and applies a force that causes it to slide up (to lock) and down (to unlock) within a path defined by extensions (54) extending inwardly from the respective halves of the housing (12). Upon the application of an upward force on the actuator's exposed surface (48), the slide plate's free end (56) moves upward along its defined path to engage the tape's bottom surface (20).

In order to cushion the impact of tape's end stop (28) against the edges of the tape opening (14) upon retraction of the tape (16), a top (80) and a bottom (82) bumper mechanism are provided at the edges of the tape opening (14). In a preferred embodiment, these bumper mechanisms consist of a one-piece construction and are formed from a resilient material which can absorb the impact of the tape's end stop (28).

FIG. 5 reveals that the top bumper mechanism (80) and the lock mechanism's slide plate work cooperatively. When the slide plate's free end (56) moves sufficiently far upward, it engages the tape's bottom surface (20) and presses it against a contact portion (84) of the top bumper mechanism (80) so as to pinch a portion of the tape (16) to lock it at a desired extended position. Upon the application of a downward force on the actuator's exposed surface, the slide plate's free end (56) moves downward so as to unlock the tape (16).

Since the contact portion (84) of the top bumper mechanism is near the edges of the housing's tape opening (14), the tape still retains its concave upward, cross-sectional shape at this point, as it has not yet begun to be coiled about its central hub (90) so as to flatten the tape's upward-turned edges.

In order to allow for the maximum, unbending extension of the tape's free end (26) from its housing (12), it is important that its lock mechanism not apply any forces on the tape's edges (22, 24) which cause them to be turned downward. In a preferred embodiment, this is accomplished by configuring the top bumper's contact portion (84) so that it has a convex, downward-directed curvature which is equivalent and complimentary to that of the original, upward concave curvature of the tape (16). See FIG. 6.

In describing this locking mechanism it should be recognized that many different mechanical motions and locations for it are possible. For example, rather than the actuator having a pivoting motion it could alternatively have a sliding motion along the housing's surface.

Figure 7:
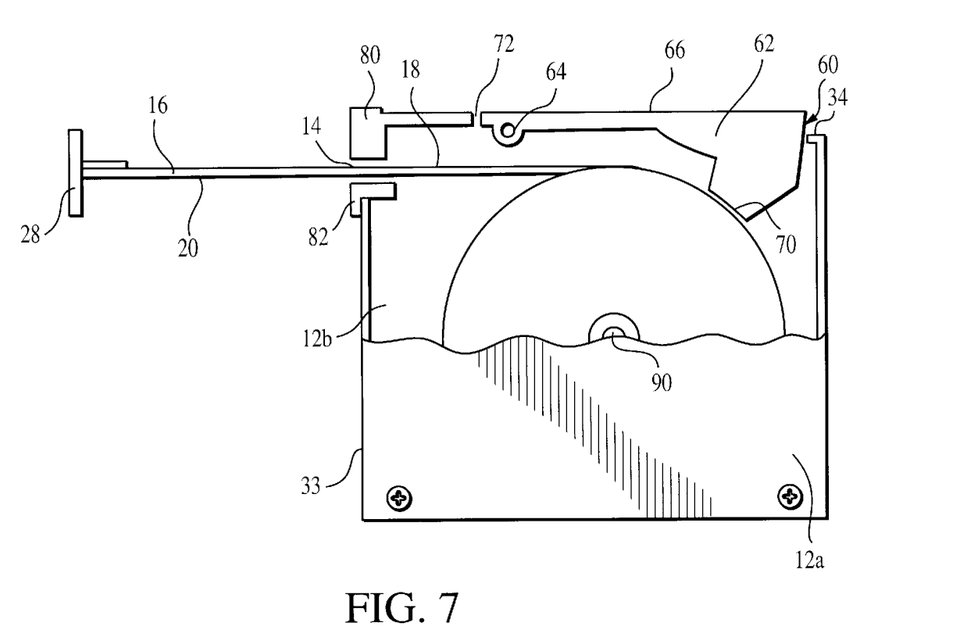
FIG. 7 a side view of another embodiment of the present invention showing a top-portion-located lock mechanism

Similarly, the lock mechanism can be located on other portions of the housing. For example, a top, tape lock mechanism (60) can be provided. See FIG. 7. This mechanism includes an actuator (62), the exposed surface (66) of which extends thorough an actuator opening (72) in the housing's top portion (34). This actuator is pivotly mounted on a post (64) between the casing halves (12a, 12b). Upon the application of a downward force on the actuator's exposed surface, the actuator's contact member (70) moves downward so as engage and press against the tape's top surface (18) at a point where the tape has already begun to be coiled about its central hub and where the tape's edges (22, 24) have been turned downward and the tape's cross-section flattened. Since the operation of this type of lock depends upon the tape having been flattened, it can be noted that this sort of top, tape locking mechanism could just as well be employed to lock the tape by applying it to other potions of the housing, such as the back and bottom portions of the housing.

The measuring tape (16) is coiled within the housing (12) about a hub (90) and its inner end (27) is secured to the hub in any convenient manner. A coiled spring is located within the hub and is connected to a central shaft of the housing (12). This coiled spring operates in the known manner to automatically retract the tape (16) into the housing (12). Because this mechanism is known, it is not described herein in detail.

Figure 1:
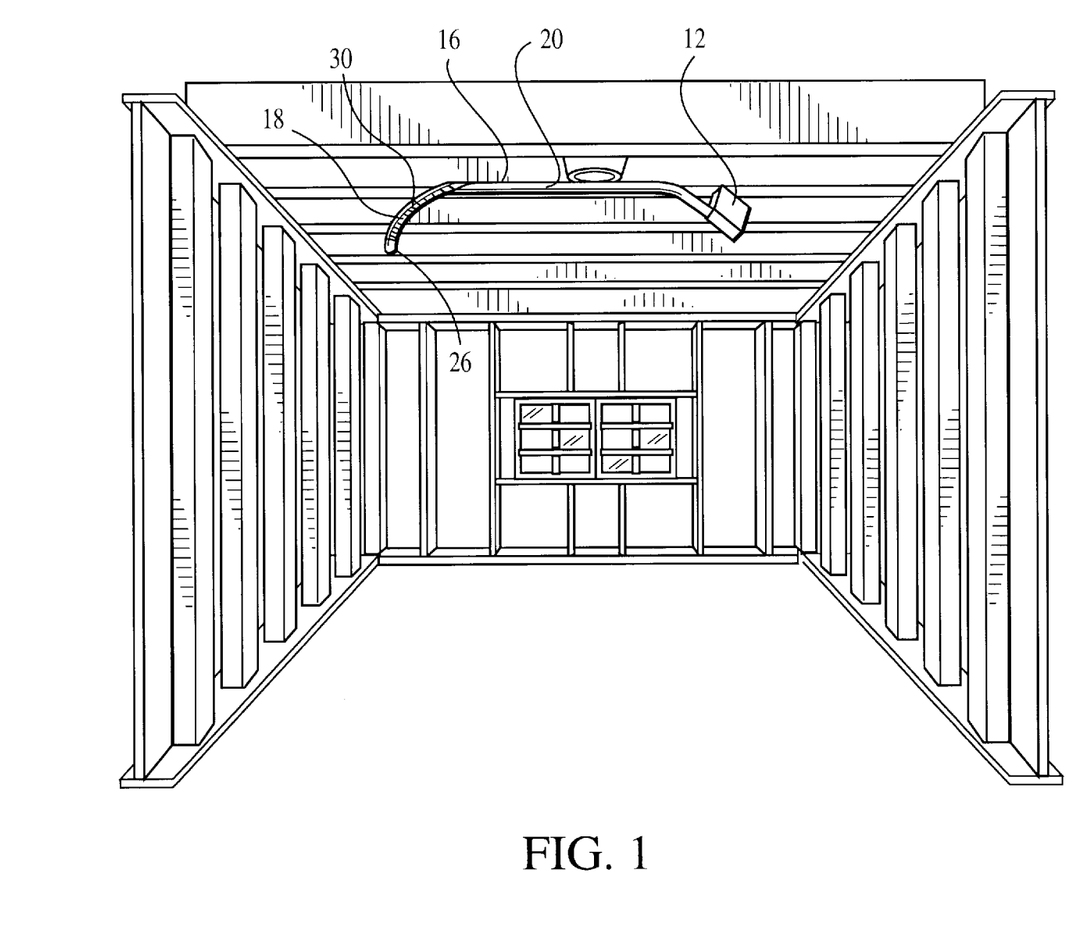
FIG. 1 is a perspective view of a standard, retractable tape measure as it is being used to make a measurement beneath a ceiling.
Figure 2:
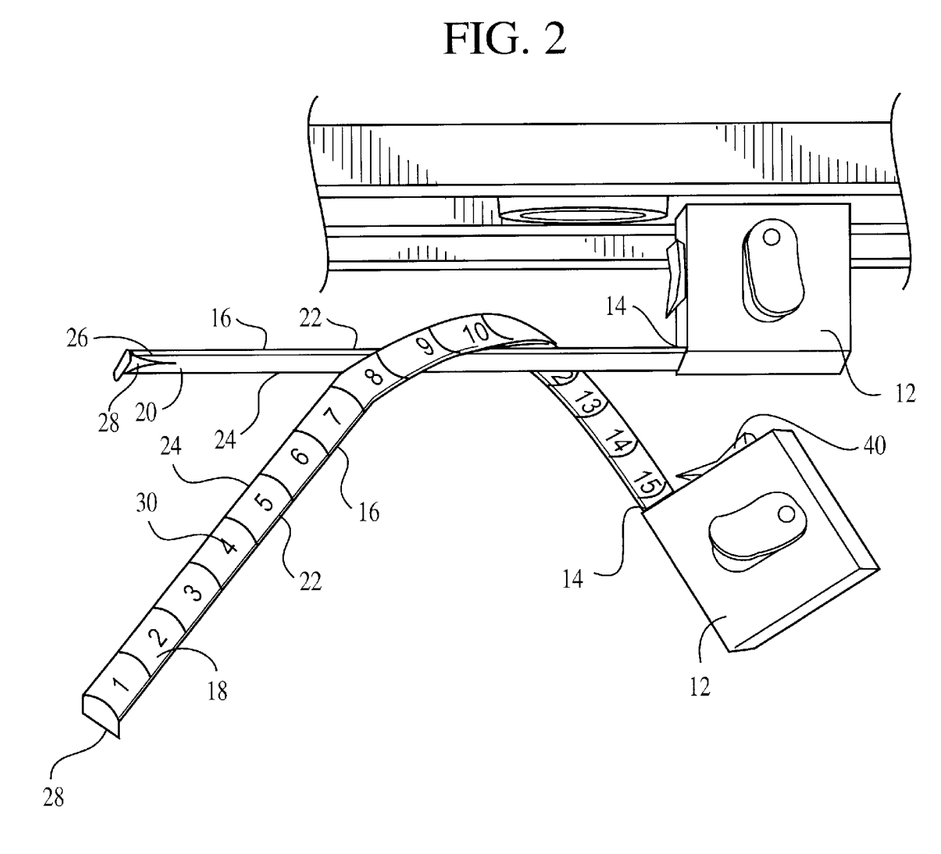
FIG. 2 is a perspective view of a standard tape measure showing some of the problems that can be encountered in using such a tape measure.
Figure 8:
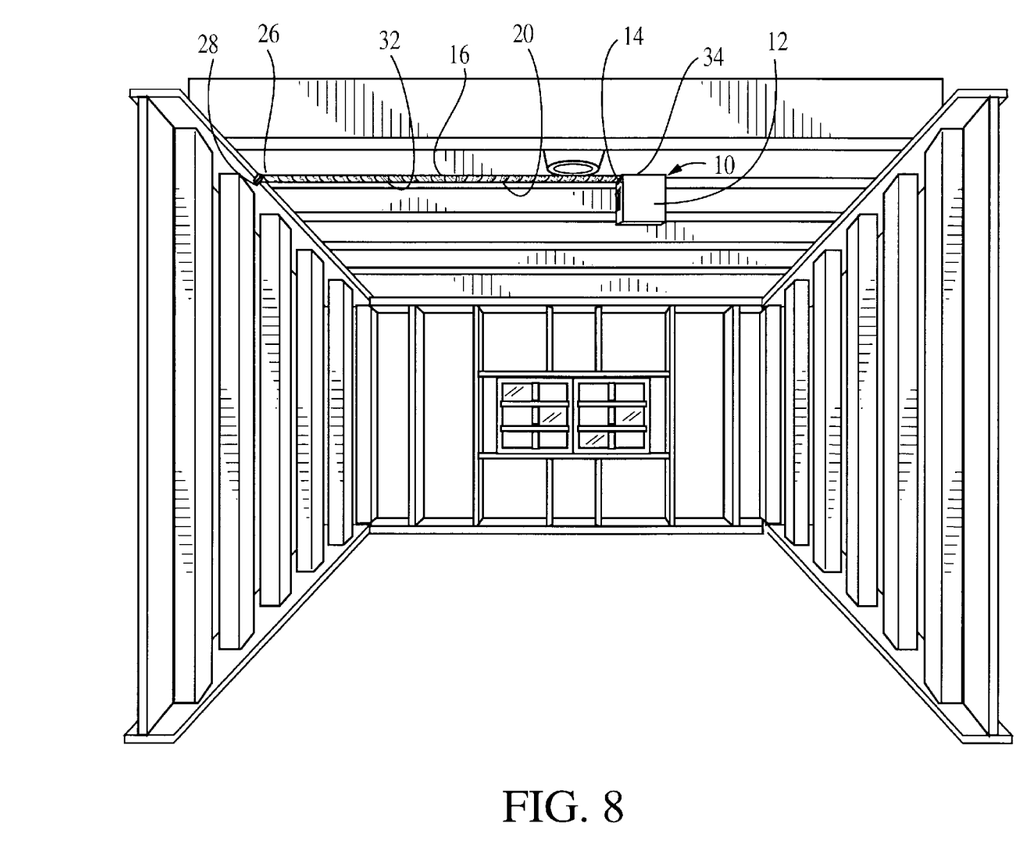
FIG. 8 is a perspective view of an embodiment of the present invention being used to make the same measurement previously shown in FIG. 1
Figures 9A, 9B:
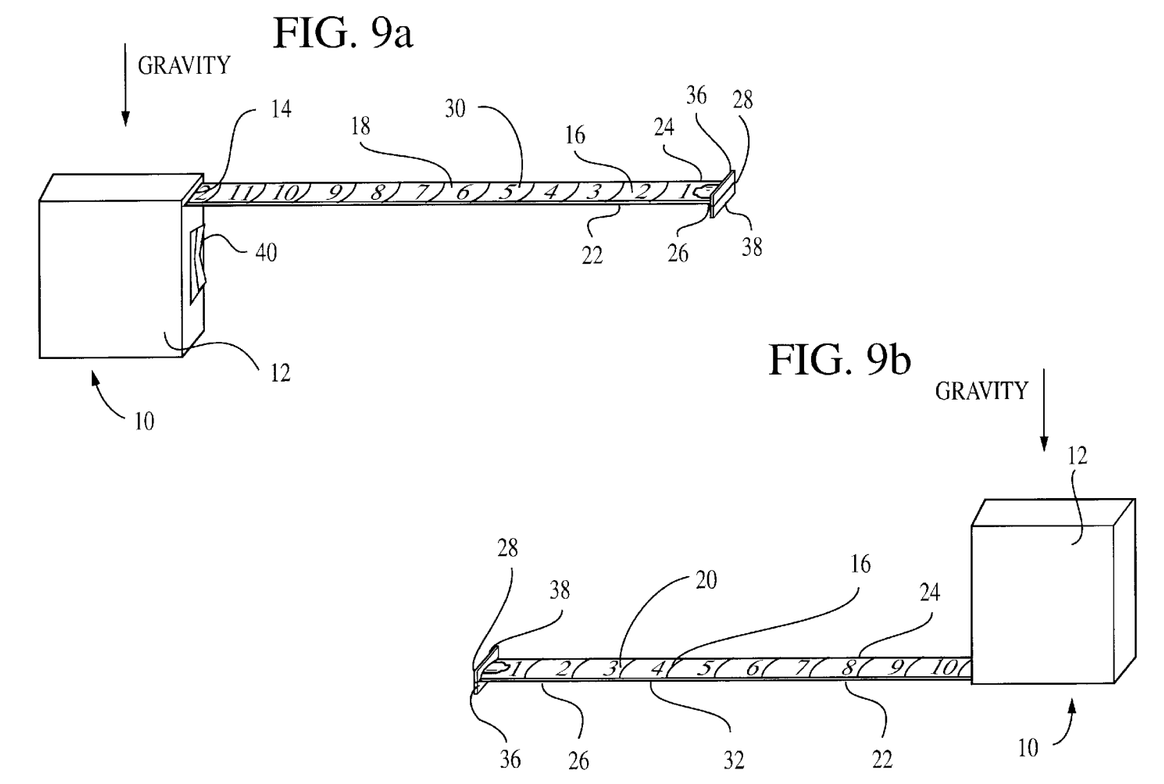
FIG. 9 is a perspective view of an embodiment of the present invention shown in (a) in its upright position so that the tape's edges are turned upward against gravity, and in (b) when it has been turned over to get the housing out of the way when a measurement is being made on a floor.

The advantages of the present invention for making measurements against overhead surfaces are further seen in FIG. 8 which shows the present invention being used to make the same measurement previously shown in FIG. 1–2. The addition of bottom measurement indicia (32) on the bottom surface (20) of the tape (1) are seen to eliminate the previous need to bend the tape downward and away from the ceiling to allow the numbers (30) to be read on the top surface (18) of the tape (16). Also, the location of the housing opening (14) in the top portion (34) of the housing eliminates the need to move the bulk of the housing (12) downward and away from the ceiling.

Figure 6:
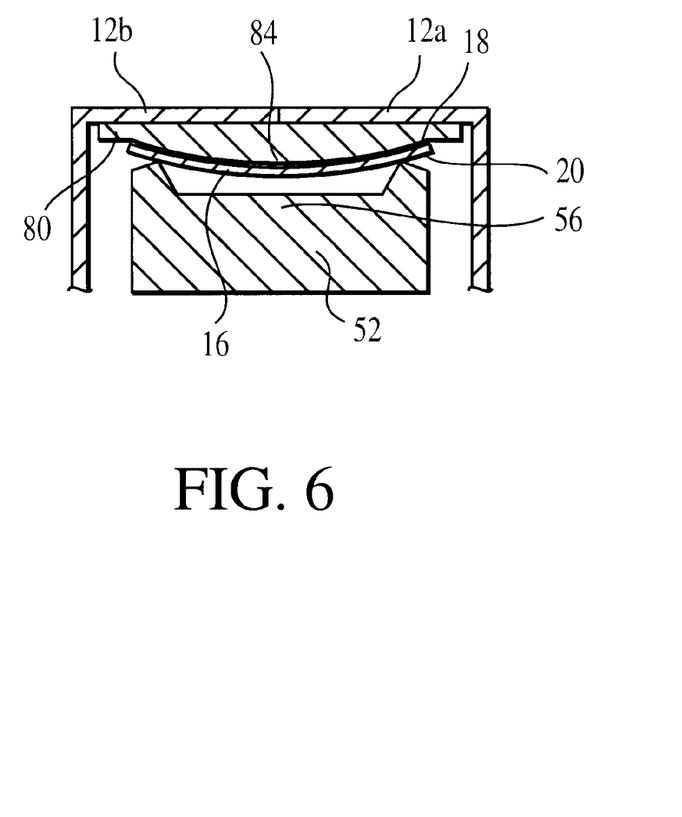
FIG. 6 a front view of an embodiment of the present invention showing the complimentary nature of the top bumper's cross-sectional convex, downward-directed curvature and its interaction with the upward, concave curvature of the tape.

This embodiment of the present invention is also seen to be as easy to use as a standard tape measure when making measurement on a floor. For such measurements, the present invention is just rotated 180 degrees so as to allow the top portion (34) of the housing (12) to be placed directly on the floor. As shown in FIG. 6(b), the tape's edges (22, 24) now point toward the floor and thus no longer aid in stiffening the extended length of the tape (16). However, this is not a problem, since the top surface (18) of the tape (16) can actually lie against the floor.

Furthermore, because the tape of the present invention is made to be rotated 180 degrees and used, the tape's end stop (28) is configured so that it has upper (36) and lower (38) fingers that extend, respectively, above and below the tape's top (18) and bottom (20) surfaces. Thus, when such a tape (10) is rotated, the end stop (28) can still easily be hooked onto a protuberance or slot in a floor so as to locate or tie-down the free end (26) of the tape in order to make a specific measurement on the floor.

While the invention has been described in combination with embodiments thereof it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A retractable tape measure comprising:
   a housing having a tape opening, a top portion and a front portion,
   said tape opening located in said front portion, wherein said tape opening having a continuous boundary edge in which every portion of said boundary edge lying in close proximity to said front portion,
   said top portion including a portion for contacting a surge on an object to be measured,
   a retractable measuring tape positioned within said housing and having a top and a bottom surface, edges that turn upward in a direction toward said housing portion for contacting the surface of the object to be measured and turn upward along substantially an entire length of said extended tape when in use so as to stiffen said tape from being bent downward, and a free end extending through said opening,
   an end stop mounted on said free end,
   top measurement indicia inscribed on the top surface of said measuring tape,
   bottom measurement indicia inscribed on the bottom surface of said measuring tape,
   wherein said tape opening is in close proximity to said top portion so that when said tape measure is being used to measure against an overhead surface, with said edges being in close proximity to said overhead surface, the portion of said tape extending through said opening which is in close proximity to said housing is positionable in close proximity to said overhead surface without having to bend said tape to move said housing away from said overhead surface.

2. A retractable tape measure as recited in claim 1, wherein said end stop comprises an upper finger that extends above said top surface and a lower finger that extends below said bottom surface.

3. A retractable tape measure as recited in claim 2, further comprising a lock mechanism connected to said housing for locking said tape against movement into and out of said housing.

4. A retractable tape measure as recited in claim 3, wherein said lock mechanism being located in said front portion of said housing.

5. A retractable tape measure as recited in claim 4, wherein said lock mechanism having an actuator and a slide plate having a free end, said actuator being mounted in said housing beneath said tape opening, said actuator connected to said slide plate, said actuator having an exposed surface which extends through an actuator opening in said front portion of said housing, wherein said actuator being movable between a first and a second position.

6. A retractable tape measure as recited in claim 5, further comprising a bumper mechanism affixed to an edge of said tape opening for cushioning the impact of said end stop when said tape free end is retracted into said housing.

7. A retractable tape measure as recited in claim 6, wherein:
   said bumper mechanism being connected proximate the top edge of said tape opening and having a contact portion extending above a portion of said tape top surface,
   when said actuator is moved to said second position, said slide plate free end moves upward to engage a point on the tape bottom surface so as to press a point on the tape top surface against said bumper contact portion to lock said tape against movement into and out of said housing.

8. A retractable tape measure as recited in claim 7, wherein said bumper mechanism contact portion having a cross-sectional profile that is convex, downward-directed and complimentary to the tape's top surface, cross-sectional profile so as to prevent the downward turning of said tape edges when said lock mechanism locks said tape against movement into and out of said housing.

9. A retractable tape measure as recited in claim 8, further comprising a bottom bumper mechanism affixed to the bottom edge of said tape opening for cushioning the impact of said end stop when said tape free end is retracted into said housing.

10. A retractable tape measure as recited in claim 4, further comprising a bumper mechanism affixed proximate an edge of said tape opening for cushioning the impact of said end stop when said tape free end is retracted into said housing.

11. A retractable tape measure as recited in claim 3, further comprising a bumper mechanism affixed to an edge of said tape opening for cushioning the impact of said end stop when said tape free end is retracted into said housing.

12. A retractable tape measure as recited in claim 3, wherein said lock mechanism being located in said top portion of said housing.

13. A retractable tape measure as recited in claim 12, wherein said lock mechanism having an actuator mounted in said housing top portion, said actuator having an exposed surface which extends through an actuator opening in said top portion of said housing, wherein said actuator being movable between a first and a second position.

14. A retractable tape measure as recited in claim 13, further comprising a bumper mechanism affixed to an edge of said tape opening for cushioning the impact of said end stop when said tape free end is retracted into said housing.

15. A retractable tape measure comprising:
  a housing having a measuring means opening, a top portion and a front portion,
  said tape opening located in said front portion, wherein said tape opening having a continuous boundary edge in which every portion of said boundary edge lying in close proximity to said font portion,
  said top portion including a potion for contacting a surface of an object to be measured,
  a retractable measuring means positioned within said housing having a top and a bottom surface, edges that turn upward in a direction toward said housing portion for contacting the surface of the object to be measured and turn upward along substantially an entire length of said measuring means when in use so as to stiffen said measuring means from being bent downward, and a free end extending through said opening,
  an end stop means mounted on said free end,
  top measurement indicia inscribed on the top surface of said measuring means,
  bottom measurement indicia inscribed on the bottom surface of said measuring means,
  wherein said tape opening is in close proximity to said top portion so that when said tape measure is being used to measure against an overhead surface, with said edges being in close proximity to said overhead surface, the portion of said measuring means extending through said opening which is in close proximity to said housing is positionable in close proximity to said overhead surface without having to bend said measuring means to move said housing away from said overhead surface.

16. A retractable tape measure as recited in claim 15, wherein said end stop means comprises an upper finger that extends above said top surface and a lower finger that extends below said bottom surface.

17. A retractable tape measure as recited in claim 16, further comprising a lock mechanism means connected to said housing for locking said measuring means against movement into and out of said housing.

18. A retractable tape measure as recited in claim 17, wherein said lock mechanism means being located in said front portion of said housing.

19. A retractable tape measure as recited in claim 18, wherein said lock mechanism means having an actuator and a slide plate having a free end, said actuator being mounted in said housing beneath said measuring means opening, said actuator connected to said slide plate, said actuator having an exposed surface which extends through an actuator opening in said front portion of said housing, wherein said actuator being movable between a first and a second position.

20. A retractable tape measure as recited in claim 19, further comprising a bumper mechanism means affixed to an edge of said measuring means opening for cushioning the impact of said end stop means when said measuring means free end is retracted into said housing.

21. A retractable tape measure as recited in claim 20, wherein:
  said bumper mechanism means being connected proximate the top edge of said measuring means opening and having a contact portion extending above a portion of said measuring means top surface,
  when said actuator is moved to said second position, said slide plate free end moves upward to engage a point on the measuring means bottom surface so as to press a point on the measuring means top surface against said bumper contact portion to lock said measuring means against movement into and out of said housing.

22. A retractable tape measure as recited in claim 21, wherein said bumper mechanism means contact portion having a cross-sectional profile that is convex, downward-directed and complimentary to the measuring mean's top surface, cross-sectional profile so as to prevent the downward turning of said measuring means edges when said lock mechanism means locks said measuring means against movement into and out of said housing.

23. A retractable tape measure as recited in claim 22, further comprising a bottom bumper mechanism means affixed to the bottom edge of said measuring means opening for cushioning the impact of said end stop means when said measuring means free end is retracted into said housing.

24. A retractable tape measure as recited in claim 18, further comprising a bumper mechanism means affixed proximate an edge of said measuring means opening for cushioning the impact of said end stop means when said measuring means free end is retracted into said housing.

25. A retractable tape measure as recited in claim 17, further comprising a bumper mechanism means affixed to an edge of said measuring means opening for cushioning the impact of said end stop means when said measuring means free end is retracted into said housing.

26. A retractable tape measure as recited in claim 17, wherein said lock mechanism means being located in said top portion of said housing.

27. A retractable tape measure as recited in claim 26, wherein said lock mechanism means having an actuator mounted in said housing top portion, said actuator having an exposed surface which extends through an actuator opening in said top portion of said housing, wherein said actuator being movable between a first and a second position.

28. A retractable tape measure as recited in claim 27, further comprising a bumper mechanism means affixed to an edge of said measuring means opening for cushioning the impact of said end stop means when said measuring means free end is retracted into said housing.

29. A method of constructing and using a retractable tape measure comprising a housing having an opening, a top portion and a front portion, said top portion including a portion for contacting a surface of an object to be measured, said tape measure further comprising a retractable measuring tape having a top and a bottom surface, edges, a free end extending through said opening, and a top measurement indicia inscribed on the top surface of said measuring tape, the method comprising the steps of:

inscribing bottom measurement indicia on the bottom surface of said measuring tape, providing said tape measure with an end stop mounted on said free end, said end stop having an upper finger that extends above said top surface and a lower finger that extends below said bottom surface, said end stop being engageable with said housing opening when said tape is retracted into said housing, turning upward said edges in a direction toward said housing portion for contacting the surface of the object to be measured and along substantially an entire length of said tape when in use so as to stiffen said tape and keep said tape from being bent downward by the force of gravity, locating said opening in said front portion and proximate said top portion of said housing, wherein said tape opening having a continuous boundary edge in which every portion of said boundary edge lying in close proximity to said front portion, wherein when said tape measure is being used to contact a surface of an object to be measured, the portion of said tape, that extends through said opening and is in closest proximity to said housing, can be held in close proximity to said object surface without having to bend said tape to move said housing away from said surface, and providing said tape measure with a lock mechanism connected to said housing for locking said tape against movement into and out of said housing.

30. A method as recited in claim 29, wherein said lock mechanism being located in said front portion of said housing.

31. A method as recited in claim 30, wherein said lock mechanism having an actuator and a slide plate having a free end, said actuator being mounted in said housing beneath said tape opening, said actuator connected to said slide plate, said actuator having an exposed surface which extends through an actuator opening in said front portion of said housing, wherein said actuator being movable between a first and a second position.

32. A method as recited in claim 31, further comprising the step of providing said tape measure with a bumper mechanism affixed to an edge of said tape opening for cushioning the impact of said end stop when said tape free end is retracted into said housing.

33. A method as recited in claim 32, wherein:

said bumper mechanism being connected proximate the top edge of said tape opening and having a contact portion extending above a portion of said tape top surface, when said actuator is moved to said second position, said slide plate free end moves upward to engage a point on the tape bottom surface so as to press a point on the tape top surface against said bumper contact portion to lock said tape against movement into and out of said housing, and said bumper mechanism contact portion having a cross-sectional profile that is convex, downward-directed and complimentary to the tape's top surface, cross-sectional profile so as to prevent the downward turning of said tape edges when said lock mechanism locks said tape against movement into and out of said housing.

34. A method as recited in claim 33, further comprising the step of providing said tape measure with a bottom bumper mechanism affixed to the bottom edge of said tape opening for cushioning the impact of said end stop when said tape free end is retracted into said housing.

35. A method as recited in claim 30, further comprising the step of providing said tape measure with a bumper mechanism affixed to an edge of said tape opening for cushioning the impact of said end stop when said tape free end is retracted into said housing.

36. A method as recited in claim 29, further comprising the step of providing said tape measure with a bumper mechanism affixed to an edge of said tape opening for cushioning the impact of said end stop when said tape free end is retracted into said housing.

37. A method as recited in claim 29, wherein said lock mechanism being located in said top portion of said housing.

38. A method as recited in claim 37, wherein said lock mechanism having an actuator mounted in said housing top portion, said actuator having an exposed surface which extends through an actuator opening in said top portion of said housing, wherein said actuator being movable between a first and a second position.

39. A method as recited in claim 38, further comprising the step of providing said tape measure with a bumper mechanism affixed to an edge of said tape opening for cushioning the impact of said end stop when said tape free end is retracted into said housing.

* * * * *